June 4, 1946.  R. F. GORDON  2,401,683
MEANS FOR MOUNTING THE TRAVELING WHEELS OF ROAD VEHICLES
Filed Jan. 8, 1944
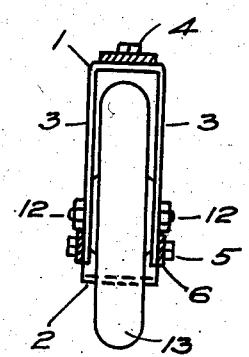
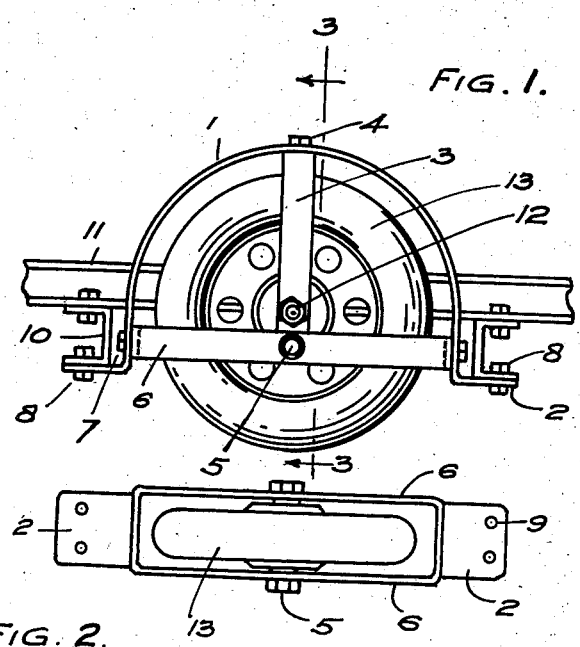
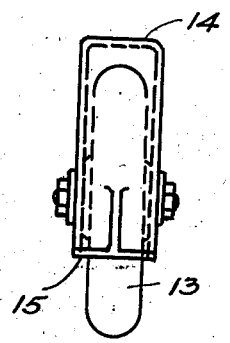
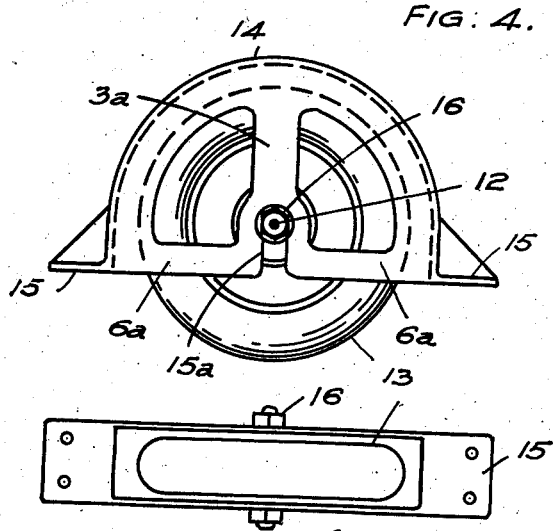

Patented June 4, 1946

2,401,683

UNITED STATES PATENT OFFICE 2,401,683

MEANS FOR MOUNTING THE TRAVELING WHEELS OF ROAD VEHICLES

Richard Frederick Gordon, Liverpool, England

Application January 8, 1944, Serial No. 517,588
In Great Britain January 27, 1943

2 Claims. (Cl. 280—152)

This invention relates to an improved means for mounting and supporting the traveling wheels of road vehicles such as trailers or the like, whereby axle trees for the wheels are dispensed with. The object of the invention is to facilitate the removal or replacement of any of the traveling wheels of such a type of road vehicle.

According to this invention all or certain of the traveling wheels of a road vehicle are each separately and rotatively mounted in a housing, frame or like mounting provided with means for detachably securing it to the vehicle body or chassis in such manner that the mounting and its wheel may be removed from the vehicle or replaced as a self-contained unit.

Two embodiments of the invention are illustrated by way of example in the accompanying drawing:

Fig. 1 being an elevation
Fig. 2 an inverted plan and
Fig. 3 an end view partly in section on the line 3—3 of one form, in which the wheel is permanently journalled in the detachable housing,
Figs. 4, 5 and 6 being similar views of a modification in which the wheel is itself detachable from the housing.

Referring first to the form shown in Figs. 1 to 3 the housing comprises a curved guard member 1 having lugs 2, vertical members 3 being secured at 4 to the guard member and at 5 to a horizontal member 6 the latter being bolted at 7 to the guard member. The lugs 2 are adapted to be secured to the vehicle, say by means of bolts 8 passing through holes 9 in the lugs and securing them to the transverse members 10 bolted to the chassis frame 11. The spindle 12 of the traveling wheel 13 is carried in the vertical members 3 and such spindle may be mounted in any suitable type of ball, roller or other bearings.

With such a construction by merely disconnecting the bolts 8 the housing 1 and the contained wheel 13 may be removed as a whole from the vehicle, when required, and a similar housing mounting a wheel refitted with a minimum expenditure of time and labour.

In the modification shown in Figs. 4, 5 and 6, the housing takes the form of a curved casing 14 having lugs 15 and vertical and horizontal members 3a, 6a forming side cheeks to the casing which are slotted at 15a. The spindle 12 of the traveling wheel 13 is mounted in the housing but in order to replace the wheel instead of detaching the whole structure by disconnecting the retaining bolts from the lugs 15 by slackening the nuts 16 on the ends of the wheel spindle, the wheel may be removed from the slots 15a and replaced by another. The retaining nuts 16 may be of the usual hexagon spanner-operated type or they may be wing nuts for hand manipulation. While two forms of the frame or housing for mounting the wheel have been described any suitable construction of detachable mounting could be utilized. The invention would be particularly applicable for use with vehicles requiring a low centre of gravity.

With either of the constructions shown a considerable advantage is offered in the replacement of a wheel on a road vehicle, and the use of axle trees for the wheels dispensed with.

I claim:

1. A detachable mounting for the traveling wheel of a road vehicle, comprising a wheel housing consisting of a semi-circular guard member, horizontal members connecting both ends of the guard member, vertical members connecting the guard to the horizontal members, and lugs on the ends of the guard member by which the housing may be bolted to the vehicle.

2. A detachable mounting for the traveling wheel of a road vehicle, comprising a wheel housing consisting of a semi-circular guard member, horizontal members connecting both ends of the guard member, vertical members connecting the guard to the horizontal members, slots at the junctions of the vertical and horizontal members for receiving the wheel spindle, and lugs on the ends of the guard member by which the housing may be bolted to the vehicle.

RICHARD FREDERICK GORDON.